Patented May 2, 1933

1,906,574

UNITED STATES PATENT OFFICE

HARRY W. GLEICHERT, OF BARBERTON, OHIO, ASSIGNOR TO PITTSBURGH PLATE GLASS COMPANY, A CORPORATION OF PENNSYLVANIA

SODA ASH BRIQUET AND METHOD OF MAKING IT

No Drawing.    Application filed April 26, 1930. Serial No. 447,771.

The invention relates to a soda ash briquet and the method of making it. Soda ash in the form of briquets or fused lumps is used as a purifier and desulphurizer for steel and iron, and it is the purpose of this invention to provide an improved form of briquet and an improved method of making it for use in this relation. The briquet may consist entirely of soda ash, or it may consist principally of soda ash with a small percentage of other ingredients, such as calcium carbonate, manganese dioxide, etc., but in all cases, the soda ash constitutes the bulk of the material depended upon to secure the desired reaction in the molten metal. More specifically, the invention has for its objects the provision of a briquet, which can be formed by a pressing action; which is very hard and tough, so that it is not apt to break up or form dust in shipment and handling; which can be satisfactorily formed in a press of ordinary construction without the use of unduly high pressures; which will not soften or deteriorate under the temperature and humidity conditions to which the briquets are subjected in storage and handling; in which the binder employed with the powdered soda ash will have no harmful effect upon the steel or iron, but on the contrary will have, in a limited way at least, a beneficial action on the steel or iron; and which can be made at a low cost.

Briefly stated, the process consists in mixing with the powdered soda ash (or soda ash plus lime or other ingredients in relatively small amount) a binder in the form of molasses. The term "molasses" as used throughout, means any kind of sugar solution, such as syrup, sorghum, or the like, the liquid refuse formed in the manufacture of sugar or alcohol being preferred, however, because of its cheapness. The amount of molasses, or the like, may vary, but is ordinarily 10 to 15 per cent by weight of the weight of the powdered material. The amount of moisture in the molasses may vary and will ordinarily run from 30 to 45 per cent by weight. The mixture, as thus formed, gives a body of material which is not sufficiently sticky to render it difficult to handle or press. The material is then formed into small briquets in the molds of a press under a pressure of about 5000 pounds per square inch. The briquets, as they come from the molds, are relatively hard and dry, and free from any trace of stickiness, which, if present, would cause them to collect and hold dust or dirt. This is believed to be due to a combination of the moisture in the molasses with the soda ash to form water of hydration. No heat is required in order to permit a ready mixing of the mollasses with the soda ash, as is the case with other binders, such as pitch or tar, which are so stiff at ordinary temperatures that mixing cannot be accomplished without the application of considerable heat.

The briquets harden still more after they are formed, and finally reach a condition approximating that of fused soda ash. As a result, the product is quite free from breakage and dust formation during handling and shipping. The action of the molasses in the use of the product is molten iron or still is also beneficial, as it acts as a reducing agent to the soda ash so that a higher percentage of metallic sodium in nascent condition is produced thus increasing the effect of the material as a purifying agent.

What I claim is:

1. A pressed briquet consisting mainly of soda ash and including a binder of molasses.

2. A briquet consisting of a soda ash mixture formed by compressing the mixture in finely divided form with a binder of molasses which is in the neighborhood of 10 to 15 per cent by weight of the soda ash.

3. A process of making briquets consisting mainly of soda ash, which consists in mixing finely divided soda ash with molasses, and forming the mixture into briquets, by the application of pressure.

4. A process of making briquets consisting mainly of soda ash, which consists in mixing finely divided soda ash with molasses, which latter constitutes approximately from 10 to 15 per cent by weight of the soda ash, and forming the mixture into briquets by the application of pressure.

In testimony whereof, I have hereunto subscribed my name this 23rd day of April, 1930.

H. W. GLEICHERT.